United States Patent
Fried et al.

(10) Patent No.: US 8,693,671 B2
(45) Date of Patent: Apr. 8, 2014

(54) NETWORK PREDICTIVE CUSTOMER SERVICE QUEUE MANAGEMENT

(75) Inventors: Lance Fried, Aventura, FL (US); Joseph Katz, Atlanta, GA (US); Rick Korfin, San Diego, CA (US)

(73) Assignee: Five9, Inc., San Ramon, CA (US)

( * ) Notice: Subject to any disclaimer, the term of this patent is extended or adjusted under 35 U.S.C. 154(b) by 0 days.

(21) Appl. No.: 13/594,356

(22) Filed: Aug. 24, 2012

(65) Prior Publication Data

US 2013/0051546 A1   Feb. 28, 2013

Related U.S. Application Data (60) Provisional application No. 61/527,761, filed on Aug. 26, 2011.

(51) Int. Cl.
*H04M 3/00* (2006.01)
*H04M 5/00* (2006.01)

(52) U.S. Cl.
USPC ............ 379/265.02; 379/265.09; 379/266.07; 379/309

(58) Field of Classification Search
USPC ................. 379/265.02, 265.09, 266.07, 309
See application file for complete search history.

(56) References Cited

U.S. PATENT DOCUMENTS

| | | |
|---|---|---|
| 5,027,387 A | 6/1991 | Moll |
| 5,311,574 A | 5/1994 | Livanos |
| 5,627,884 A | 5/1997 | Williams et al. |
| 6,253,075 B1 | 6/2001 | Beghtol et al. |
| 6,563,921 B1 | 5/2003 | Williams et al. |
| 6,697,858 B1 | 2/2004 | Ezerzer et al. |
| 6,704,412 B1 | 3/2004 | Harris et al. |
| 6,944,278 B1 | 9/2005 | Nielsen |
| 7,739,391 B2 * | 6/2010 | Marais et al. ................. 709/227 |
| 2003/0018702 A1 | 1/2003 | Broughton et al. |
| 2007/0071223 A1 | 3/2007 | Lee et al. |
| 2009/0109959 A1 * | 4/2009 | Elliott et al. .................. 370/352 |
| 2011/0110364 A1 | 5/2011 | Fried et al. |
| 2011/0191134 A1 * | 8/2011 | Jain et al. ..................... 705/7.13 |
| 2011/0243124 A1 * | 10/2011 | Huntley et al. ............... 370/352 |

FOREIGN PATENT DOCUMENTS

JP   2000312256 A  * 11/2000 ............. H04M 1/06

OTHER PUBLICATIONS

Search Report and Written Opinion for PCT/US 12/52330.

* cited by examiner

*Primary Examiner* — Quynh Nguyen
(74) *Attorney, Agent, or Firm* — Jones Day (57) ABSTRACT

A communications portal for interfacing with a carrier network, a contact center, and a user is disclosed. Telecommunications links are connected to the communications portal to receive inbound calls and place outbound calls. A gateway signaling proxy containing an application server and a reverse automation subsystem is connected to the telecommunications links to recognize and store user selections, detect answer supervision, and execute scripts as configured in the user interface.

39 Claims, 7 Drawing Sheets

NETWORK PREDICTIVE CUSTOMER SERVICE QUEUE MANAGEMENT

CROSS-REFERENCE TO RELATED APPLICATIONS

This application relates to and claims the benefit of U.S. Provisional Application No. 61/527,761 filed Aug. 26, 2011 and entitled NETWORK PREDICTIVE CUSTOMER SERVICE QUEUE MANAGEMENT, the entire content of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to telecommunications systems, and more particularly, to predictive customer service queue management.

2. Related Art

It is typical for organizations with large constituencies to receive thousands of customer inquiries each day. These may come in the form of emails, web site visits, telephone calls, or even face-to-face interaction in a retail scenario. The handling of these inquiries is oftentimes automated, including websites with self-service elements and interactive voice response systems (IVRs). N Telephone calls coming into automatic call distributors (ACDs) or private branch exchanges (PBXs) are handled by various computer-telephony integration (CTI) techniques. Such automation is employed as a means to reduce costs and reduce the need for live customer service personnel to handle these inquiries. Nevertheless, larger organizations tend to spend millions of dollars each year on the development and maintenance of systems used to handle customer interaction.

From the user's perspective, however, there are several problems associated with interactive voice response systems. Many are poorly designed and can be very frustrating for the user to navigate. Indeed, some customers are so loathe to use automated systems for this reason, that they will instantly "opt out" of an automated system and demand live service. Of course, the wholesale adoption of this practice is costly for companies that employ automation systems. Additionally, users must traverse complex interfaces to different options and selections that assist with the improved routing of the call to the appropriate customer service agent. However, even after navigating through numerous prompts, callers may be placed on hold for a long period of time while earlier callers in the queue are being serviced. Although improvements have been made to better staff call centers during times of peak volume or in anticipation of high volumes attributable to some other cause, extensive hold times further frustrate the customer experience. A frequent complaint is that customers have something better or more productive to do rather than waiting for the call to be answered.

From the perspective of the organization, long hold times are also problematic. It is most often the case that a primary customer service number is toll-free to the caller/customer, but there are otherwise high costs incurred by the organization. Thus, the longer a customer is placed on hold through an in-bound 8xx call, the more expensive that particular phone call is. Companies have not adapted to the newer Voice Over Internet Protocol (VoIP) capabilities because it is difficult to link these capabilities to an 800 number. Furthermore, customers do not have an incentive to use a VoIP-based phone when the number they are calling is free to them.

Accordingly, there is a need in the art for an improved customer service queue management system that minimizes time spent on hold to the benefit of the caller and the call center. There is also a need in the art for a queue management system that can accept incoming calls and re-initiate calls based on predicted queue length.

BRIEF SUMMARY

In accordance with one embodiment of the present disclosure, a communications portal system is contemplated. There may be a first telecommunications link to one or more carrier networks and receptive to inbound calls. There may also be a second telecommunications link to a contact center for bridging inbound calls thereto. The system may include a gateway signaling proxy that is connected to the first telecommunications link and the second telecommunications link. The gateway signaling proxy may be operative to set up, tear down, and bridge the inbound calls from the first telecommunications link to the contact center over the second communications link. There may be a telecommunications control server connected to the gateway signaling proxy. Telecommunication link commands may be issued by the telecommunications control server to direct the gateway signal proxy. The system may further include a database, as well as an application server that executes automated scripts corresponding to those of the contact center with input parameters retrieved from the database. The application server is understood to manage connections between the first telecommunications link and the second telecommunications link with the telecommunications control server. Furthermore, the system may include a media server connected to the application server and the telecommunications control server for recording and playback of call progress and user navigation data.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

Figure 1:
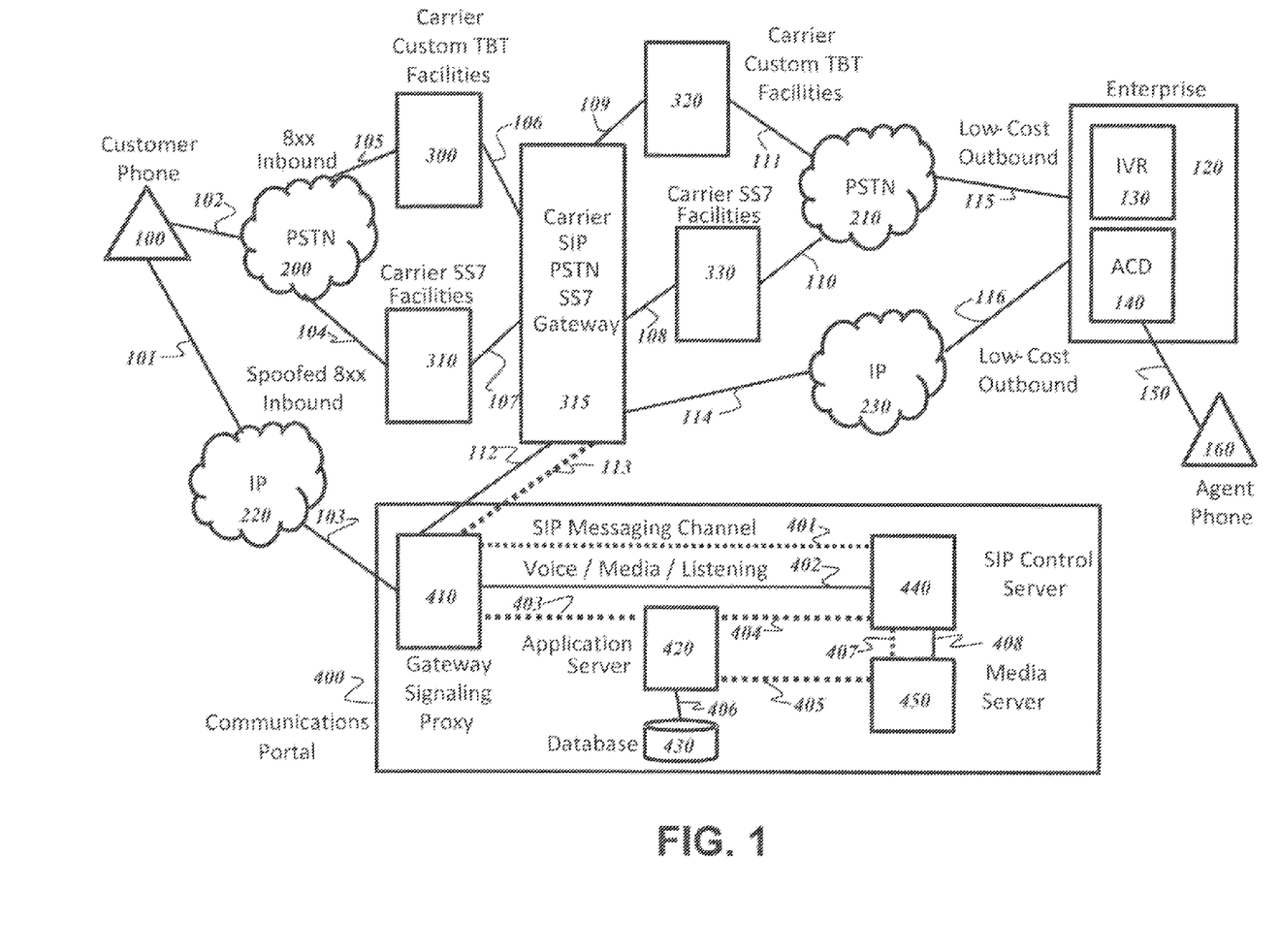
FIG. 1 is a block diagram illustrating one embodiment of a direct dial virtual queuing system in accordance with one embodiment of the present disclosure.

FIG. 1 is a block diagram illustrating one embodiment of a network predictive customer service queue management deployment. A caller can initiate a telephone call to an enterprise or individual on his telephone 100. This may be a regular POTS (plain old telephone system) telephone or a smartphone, such as a blackberry or iPhone capable of communicating over IP data facilities and also over the public switched telephone network (PSTN). If by smartphone, a speed dial button or smartphone application may be used to initiate a semi-automated request for a callback conveyed over IP facilities 101 to an IP network 220. Such a request over IP networks 220 may utilize IP signaling instead of more expensive 8xx (toll-free) facilities. Such facilities are "free" for the caller but not for the enterprise receiving the calls. IP signals from a Smartphone may be translated by a communications portal 400 whereupon subsequent outbound calls to the enterprise can be placed over less expensive facilities in a gateway signaling proxy 410.

An IP connection 103 is made from the smartphone to the communications portal 400. At the communications portal 400, the digital request for a callback from the smartphone application is processed by the gateway signaling proxy 410, with the requested information being passed over data communications channels 403 to the application server 420.

The application server 420 queries the database 430 over the data communications channel 406 in order to retrieve any stored caller information such as pre-stored script information for a particular enterprise. If such a script is found that matches with the current request, the gateway signaling proxy 410 will be commanded by the application server 420 to execute a script that will make an outbound call over communications channels 112 and 113 which, in a preferred embodiment of the invention, can be SIP (session initiation protocol) based facilities connecting to a carrier or carriers.

A PSTN-based connection 102 from a POTS phone are made over PSTN facilities and over a PSTN network 200. From here, the phone call may be sent over PSTN facilities 105 or 104 to a carrier custom take-back-and-transfer system (TBT) 300 or carrier SS7 facilities system 310 respectively. In a preferred embodiment of the invention, such carrier facilities 300, 310 will have the common ability to put a caller's call on "hold" while value-added services such as courtesy ring-back tones, call bridging to other telephone lines, transfers, and other common functions are achieved. Such is the case with commonly available SS7 applications and proprietary network signaling applications.

It is understood that a telecommunications device may be connected to the carrier's network for the purpose of assisting with routing decisions. This commonly occurs using a remote data gateway, which receives a request for routing instructions, and returns a destination label that the toll-free network can use to determine the logical termination point of the call. This is referred to as third party call control when the implementation is used to determine on a step-by-step basis which prompts are utilized by the network IVR. Signaling from the carrier custom TBT system 106 or the carrier SS7 system 107 are able to communicate with a carrier SIP/PSTN/SS7 gateway server 315 which performs protocol conversion for common signaling systems into SIP signaling. Signals from the carrier the carrier SIP/PSTN/SS7 gateway server 315 are conveyed to the communications portal 400 over communications channels 112 and 113. In a preferred embodiment of the invention, communications channel 112 is a bearer channel such as an RTP voice channel, and the communications channel 113 is a control channel as in SIP messaging. Communications channels 112, 113 are used for incoming signals from a PSTN call placed by the caller. Furthermore, communications channels 112 and 113 are also used for outbound calls initiated by the communications portal 400, and also for outbound calls initiated by the communications portal 400 as requested by scripts used on behalf of callers initiating calls from a smartphone.

The gateway signaling proxy 410, the SIP control server 440, the database 430 and media server 450 are all connected together via data communications channels 403, 404, 406, and 405, respectively, to the application server 420. In a preferred embodiment of the invention, the application server 420 acts as the software state controller for the communications portal 400 and is responsible for taking action on the requested telephone, smartphone, and associated callback requests.

The gateway signaling proxy 410 and SIP control server 440 communicate call control, real time voice traffic, recording, and play-back signals over communications channels 401 and 402. In a preferred embodiment of the invention, these communications channels are for SIP messaging and bearer channels, respectively; however alternate methods commonly used in telephony such as SS7 or proprietary signaling are not discounted. The communications portal 400, and more specifically, the gateway signaling proxy 410 will receive incoming messages over communications channels 103, 112, and/or 113 and send call information and application request information to the application server 420.

The application server 420 will send signals over the data communication channel 404 to the SIP control server 440 in order to control call set-up and tear-down on the communications channels 401 and 402. The purpose of these commands is to open-up voice communication for the playing-out of prompts and call progress tones, recording spoken words from the caller, recording touch-tones from the caller, and for transferring or bridging calls via the gateway signaling proxy 410 which is connected via communications channels 112 and 113 to the carrier network.

The application server 420 is also connected via data communications channel 405 to the media server 450 in order to command the media server to alternately record caller speech, record touch-tones input by the caller, and play-out call progress tones or prompts. These recordings and play backs are conveyed over data communications and voice communications channels 407 and 408 respectively. In a preferred embodiment of the invention such communications facilities would use the SIP protocol, with a separation of content and control. There are a variety of ways this can be accomplished without SIP signaling as can be contemplated by the average practitioner in telecommunications.

The application server 420 is also connected to the database 430 via the data communications channel 406. The database is used to store a variety of information which will govern the flow of some communications. For example, in a preferred embodiment of the invention, the database will hold customer/caller information such as preferred call-back numbers, ANI (Automatic Number Identification) associated with callers, schedule information for timing of callbacks based on availability of ACD (Automatic Call Distributor) 140 queues, historical call pattern data for each call center programmed into the Communications Portal System via the application server, scripts for executing menus in IVR systems 130, recorded spoken word or touch-tone data representing caller navigation of carrier telephone systems, IVR systems 130, and ACD systems 140.

Configurable threshold data for queue length prediction, traffic patterns, and actions can be entered into the database manually via the application server 420. In a preferred embodiment of the invention, database access tools such as IBMs Cognos can be used to present and act on traffic prediction data. A practitioner in database technologies will be familiar with direct database views or SQL query commands that can be made to work as a UI (user interface) in the application server 420 for the purposes of setting and changing queue threshold data.

The database 430 is queried by the application server 420 over the data communications channel 406 in order to retrieve any stored caller information such as pre-stored script information for a particular enterprise. If such a script is found that matches with the current request, gateway signaling proxy 410 will be commanded by the application server 420 to execute a script that will make an outbound call over the communications channels 112 and 113 which, in a preferred embodiment of the invention will be SIP-based facilities connecting to a carrier or carriers.

At the gateway signaling proxy 410, once an inbound call from a Smartphone or POTS phone is established, and once the correct automated script and destination information are ascertained. It will be recognized that telecommunications devices interfacing a carrier's network does not need to perform answer supervision in order to collect data about a call. When a call arrives, this device can obtain information such as automatic number identification (ANI) and dialed number identification service (DNIS) using methods such as SS7. The device may then send a busy/no answer reroute (BNAR) signal to the carrier network indicating that the device will not accept the call. Based on such caller input or ANI, communications channels 112 and/or 113 are used to set up the outbound calls to the enterprise via the carrier. At the carrier SIP/PSTN/SS7 gateway 315, communications channels 108 or 109 and used to set up outbound calls through the carrier custom TBT facilities 320 or the carrier SS7 facilities 330, respectively. These facilities in turn, pass calls to the PSTN 210 over the communications channels 111 and 112 respectively. In an alternate embodiment of the invention, the carrier SIP/PSTN/SS7 gateway 315 may send outbound calls over the communications channel 114 as VoIP-based calls over the IP network 230.

A communications channel 116 part of the IP network 230 may be used to connect the caller to the enterprise 120 and more particularly to the IVR system 130 and/or the ACD system 140. Such communication channel 116 may terminate directly on the IVR system 130 and/or the ACD system 140, or may terminate at the enterprise 120 on a commonly available VoIP/PSTN gateway, such that is often used to convert IP signals to regular POTS telephone signals for systems not having a native VoIP Interface.

A communications channel 115 from the PSTN network 210 may be used to connect the caller to the enterprise 120 and further, to the IVR system 130 and/or the ACD system 140. Such communication channel 115 may terminate directly on the IVR system 130 and/or the ACD system 140, or may terminate at the enterprise 120 on a commonly available PSTN/VoIP gateway, such that is often used to convert PSTN signals to IP signals for telephone systems with a native VoIP Interface.

At the IVR system 130, callers are typically presented with a menu of speech or touch-tone activated prompts for the purpose of semi-automating call navigation to an agent or to provide self-service. Such systems are commonly available from vendors such as Cisco and Avaya. The caller may now enter in touch tone answers to routing questions posed by the IVR system 130. Alternately, the caller may now enter speech commands that approximate the same result as the touch tone commands. Such spoken words or touch tone commands may be recorded by the media server 450 inasmuch as the SIP control server 440, under the control of the application server 420 will manipulate communication channels 401 and 402 so a listen/record mode can be achieved without disturbing the caller. Any average practitioner in SIP communications will find the bridging of calls for the purposes of recording and playback to be routine. In a preferred embodiment of the invention, the callers' voice and touch-tones are thus recorded before the call is either released to the carrier for subsequent termination, or before the caller is prompted by the media server 450 to hang up after selecting call back options.

Similarly, the ACD system 140 may also be equipped with an IVR-like function to prompt callers for routing information either with touch-tone input or speech input. Regardless of this navigation function being offered by the IVR system 130 or the ACD system 140 or some similar device, the communications portal 400 may silently remain in the loop of the telephone call in order to record navigation choices made by the caller for use later on in the same transaction, or for use in subsequent transactions whereupon the caller captured navigation data is stored in the database 430.

In another embodiment of the invention, the communications portal 400 can be used to emulate the IVR system 130 function so calls do not have to be made into the enterprise 120 until advantageous to do so from a cost standpoint. For example, the communications portal 400 can be programmed to prompt the caller for needed navigation information that is then stored in the database and used as part of an automated script to be acted on later or in subsequent interactions Likewise, the communications portal 400 can be used to play-out prompts to ask the caller for preferred call back times and locations.

At the ACD system 140, the communications channel 150 is used to connect callers to an agent who is manning an agent phone 160. Various methods may be used to connect the agent. These methods include proprietary signaling, VoIP, or PSTN connections. Additionally, ANI, DNIS, and IVR menu selections can be used to determine the optimal agent skill set or automated resource to provide service to the consumer. It is also recognized that other commonly known information (time of day, day of week) or data held in other databases may be useful for inferring the type of service sought by the consumer. Using this information, the call is placed in a queue or trunk group that is most likely to contain agents/resources that possess these skill sets.

Outbound calls from the communications portal 400 to the ACD system 140 and ultimately to the agent phone 160 can be made on behalf of callers without the caller being on the line. Once the caller navigation information has been determined, either by real-time monitoring and recording of requested destination information as described above, or by the execution of a script in the application server 420, drawing upon stored information in the database 430, the communications portal 400 can set up an outbound call via the carrier network as described above and continue to process the call as if the caller were on the line—activating scripts which allow outbound calls to the enterprise 120 to be made on behalf of the caller.

In this scenario, at the communications portal 400, an outbound call to the enterprise is made based on the queue forecast and timing stored in the database 430 and called-up by the application server 420. Those having ordinary skill in the art will recognize that a database of previous call data, peak traffic data, and current call traffic information, can be used to estimate queue time for ACDs. These estimates may be derived from Erland calculations utilizing the call number, call frequency, and resource availability statistics, and these trends can be extrapolated. Such is the case with commonly available WFM (Workforce management) systems in which staffing levels are determined based on the prediction of call flows Likewise, predictive dialer systems are programmed similarly to pass calls to agents based on more outbound calls being made to called parties than there are agents to service.

In an alternate embodiment of the invention, an automated script can be used to continually call in to the ACD system 140 at the enterprise 120 and to listen for agents, answer supervision, tones, or other clues as to the length of time required during certain time frames of the day to ascertain average queue time. This is somewhat of a brute-force method, but nonetheless does not require any collaboration with on-site systems, CTI links, or applications at the enterprise.

Regardless of the preferred method, whether a predictive algorithm is used, or a brute-force tally of abandoned but connected calls, the communications portal 400 is thereby acting in the role of the caller and navigating the enterprise 120 as if it were a caller—entering in digits on behalf of the caller, and waiting in line in ACD queues as if it were the caller. In this fashion, the outbound calls facilitated by the communications portal 400 can be made separately from the initial inbound leg from the caller.

Such outbound calls, whether connected to the agent phone 160 based on a predictive algorithm to provide the least amount of time in queue, or whether connected to the agent phone 160 as a result of repeated automated calls to ascertain queue length, are then used as the "agent leg" of the callback. The communications portal 400 is then able to make a subsequent outbound call back to the original caller—either via the IP networks 220 or via the PSTN networks 200 represented by the carrier SIP/PSTN/SS7 gateway 315. Such original caller callback legs of the call will be placed based on the timing thresholds originally requested by the caller, or placed automatically based on best availability of agents queues as described above.

Regardless of the preferred method, outbound phone calls on non-8xx channels may be set up by the communications portal 400 in order to bypass the need for more expensive 8xx facilities. That is, instead of a regular 800 call flowing through the entire telephone network and terminating on the enterprise 120 systems uninterrupted—thus incurring a per-minute charge, incoming calls can be "spoofed" by the communications portal 400. For example, an incoming call can be passed to the communications portal 400 from the carrier SIP/PSTN/SS7 gateway 315 without the call being answered—for the purposes of merely extracting caller ID (ANI) and call destination (DNIS) information. It will be recognized that international callback systems have for several decades used this method of capturing call origination and destination information without providing answer supervision (e.g. without answering the phone). In this fashion, a caller may be supplied with prompts in the form of call progress tones to simply hang up the phone. Once the call origination and destination information is captured by the communications portal 400, it is therefore possible for the communications portal 400 to place agent/outbound calls into the enterprise 120 on behalf of the caller. Similarly, the communications portal 400 may then activate an outbound call to the original caller over VoIP or PSTN facilities as described above.

Having captured information entered by callers in navigating the enterprise 120, the information gathered may be automatically entered into the database 430 for recall in subsequent interactions. Such recall may include, but not be limited to error message scenarios, such that the communications portal 400 can affect re-tries when errors occur, and also include pre-determined call rejection information supplied by the carrier or third party. Such call rejection information can be stored in the database and called upon by the gateway signaling proxy 410 under the control of the application server 420 in order to refuse the processing of calls that meet certain rejection criteria including, but not limited to abuse calls, do-no-call lists, toll avoidance criteria, etc. Such call rejection can be provided to the Carrier SIP/PSTN/SS7 gateway 315 via commands from the gateway signaling proxy 410 without having supplied answer supervision. That is, the call does not have to be "answered" by the communications portal 400 for the call rejections to happen. Such is commonly the case with common intercept facilities and databases in use by carriers for the re-routing of disconnected numbers.

Figure 2:
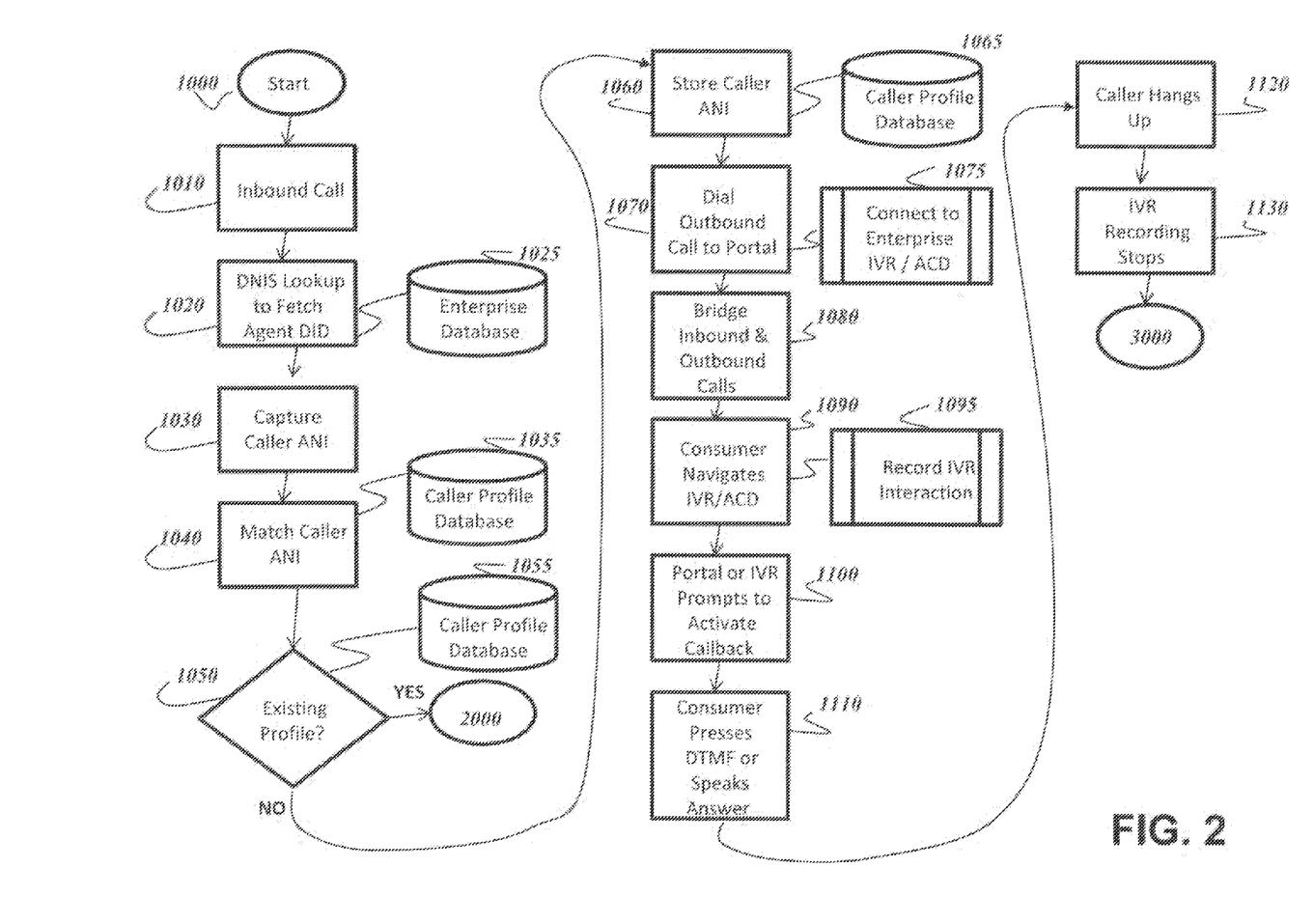
FIG. 2 is a flowchart showing the steps of setting up a proxy callback from a conventional consumer phone.

With reference to the flowchart of FIG. 2, at start point 1000, a consumer starts the process by making a call that is directed to the communications portal. At step 1010 the call commences. This call may be from a POTS consumer phone, a cell phone, or business phone. Next, at step 1020, the communications portal 400 matches the DNIS (Dialed Number Identification Service) information from the carrier and matches this number with the enterprise database 1025. This is used to ascertain the IVR/ACD queue or extension to call once an outbound leg to the enterprise 120 has been established. At step 1030, the communications portal 400 captures the caller's ANI or other identifying information that may be passed to the communications portal via the carrier. At step 1040 this ANI or other identifying information is matched with the caller profile database 1035. Then, in a step 1050, the communications portal 400 determines, based on the matching of the ANI, whether or not the caller has an existing profile in the database. If the caller does have an existing profile in the database, the progression of the transaction goes to step 2000. If the caller does not have an existing profile, at step 1060 the ANI is stored in the caller profile database 1065.

At step 1070, the communications portal 400 makes an outbound call to the enterprise IVR/ACD according to step 1075. At step 1080, the inbound call from the consumer and the outbound call to the enterprise 120 are bridged. The consumer then navigates the enterprise IVR/ACD in a step 1090 while the communications portal 400 begins to record the interactions of the consumer per step 1095 in order to build profile information to be used in subsequent interactions or for error recovery in the same transaction. The IVR/ACD then prompts the caller for preferences to activate a callback in step 1100. Such preferences may include, but are not limited to preferred call-back time, preferred callback number, and skill preferences for the agent. Alternately, the communications portal may use its own IVR capabilities to prompt the caller for preferences. At step 1110 the consumer provides answers on preferences via speech commands or touch tone commands. The caller may subsequently disconnect in a step 1120, whereupon the communications portal 400 ceases the transaction recording per step 1130. The process continues in a step 3000, discussed in further detail below.

Figure 3:
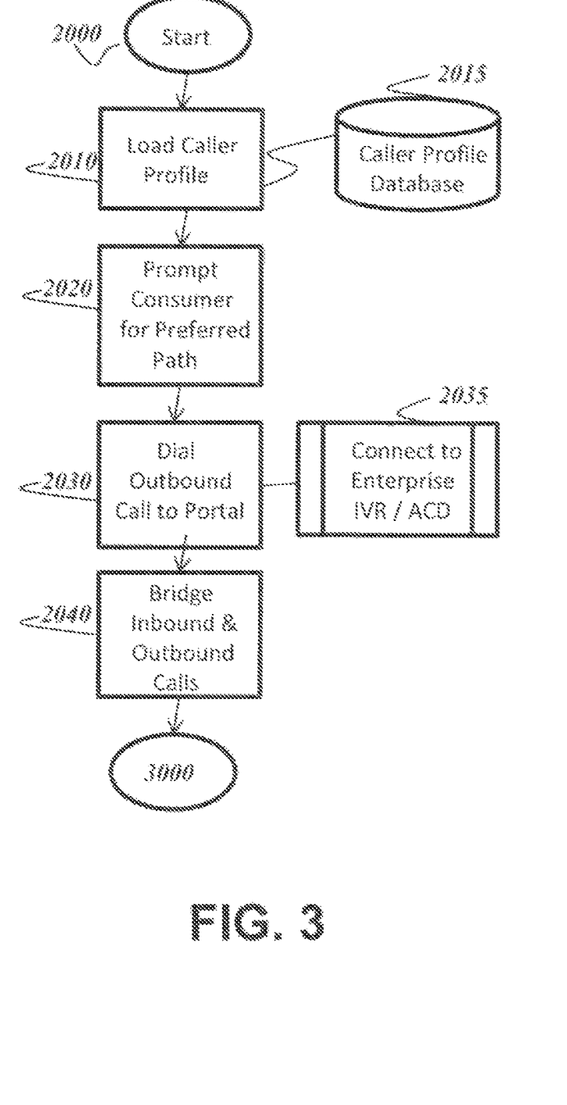
FIG. 3 is a flowchart showing the steps of setting up the proxy callback from a conventional consumer phone where the caller's profile is known.

Referring now to FIG. 3, additional details pertaining to the process where an existing profile is found per step 1050 above, will now be considered. This portion of the process begins at step 2000 as depicted, and continues with a step 2010 in which the consumer profile is loaded into memory of the communications portal 400 from the caller profile database 2015. At step 2020, the consumer is prompted for the preferred path for the enterprise 120 which is called. The responses may be in the form of speech commands or touch-tones. Such preferred paths represent navigation preferences which may be stored as quasi "Speed dial" numbers or sequences.

Next, at a step 2030, the communications portal 400 makes an outbound call to the enterprise IVR/ACD 235. Then, at step 2040, the inbound call from the consumer and the outbound call to the enterprise 120 are bridged. At this point, the profile information stored on behalf of the consumer is used to navigate the IVR/ACD 235 without intervention from the consumer. The communications portal 400 may idle the transmission path to the consumer so the consumer does not have to hear the navigation steps. At such time, courtesy tones or music may be played to the caller. The process continues with a step 3000, the details of which are discussed more fully below.

Figure 4A:
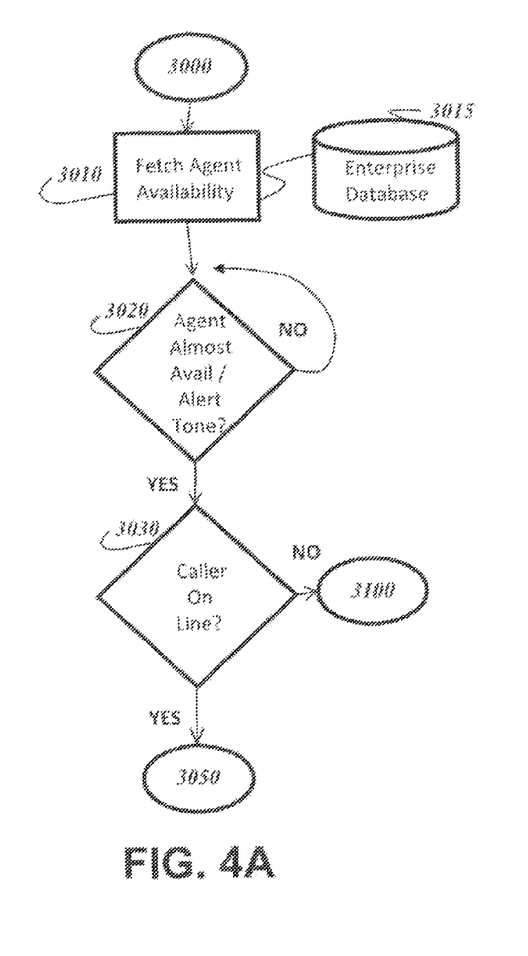
FIGS. 4A-4C are flowcharts showing proxy queuing and callback from a conventional consumer phone.

Turning now to FIG. 4A, at the process continues for a regular POTS phone interaction. At a step 3010, the communications portal 400 ascertains agent availability. This is achieved by checking the enterprise database 3015 or by using established call pattern algorithms or brute force checking as described above with reference to FIG. 1.

An agent availability confirmation may be made in a step 3020 by an available agent by responding to prompts from the communications portal. Such prompts may be in the form of spoken word or screen messages using a non-CTI widget or instant message channel. This does not preclude the ability to select an available agent without agent prompting. If an agent is not available, the communications portal 400 may play prompts to the consumer or send other on-line messages to the consumer (SMS, Email, etc.) to alert the consumer of wait times. These progress tones or messages to the consumer may continue until an agent is available.

At step 3030, a determination is made as to whether or not the consumer is already on the phone or must be called. If the caller is already on the phone, the process continues with step 3050. If the caller is not already on the phone, the process continues at step 3100.

Figure 4B:
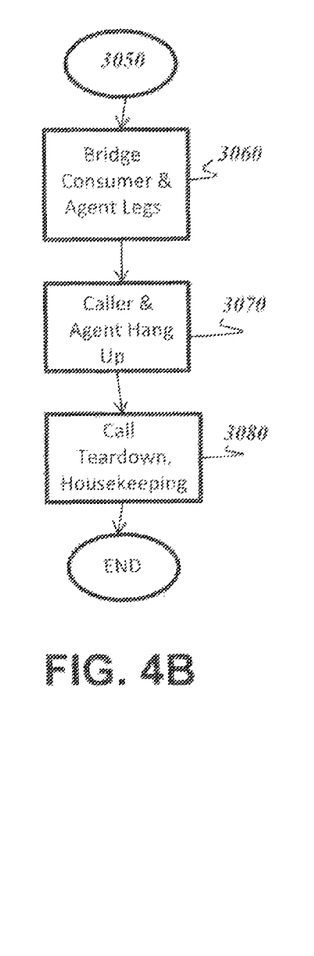

With reference to FIG. 4B, where the caller is already on the phone, the process continues with a step 3060. According to this step, when an agent is available, the communications portal 400 bridges the consumer and agent legs of the calls together. This can be achieved in the communications portal with hard bridging of the calls, or it may be achieved using TBT (Take Back and Transfer), SS7 Signaling or proprietary signaling schemes of the carrier so the communications portal no longer needs to be in the loop. Alternately, the communications portal 400 may stay in the communication in a listen-only or prompt mode and be used by the carrier as a media server and recording device. Once the communication between the consumer and the agent is complete, the caller and agent may hang up in step 3070. At this point, the communications portal 400 proceeds with call tear-down, housekeeping and finalizes call transaction information in the database for future use per step 3080.

Figure 4C:
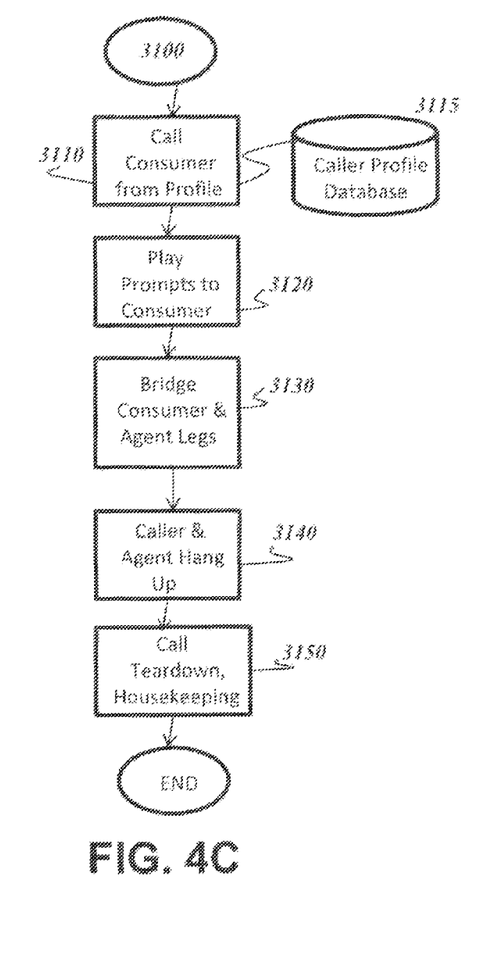

As shown in FIG. 4C, after determining the call is not on the line, the communications portal 400 loads the caller profile information into memory per step 3110 if it is not already in memory. This profile is loaded from the caller profile database 3115. At step 3120, prompts are played to the consumer, alerting the consumer of the purpose of the call, that is, to tell the caller this is the call they were expecting from the previously requested enterprise 120. At step 3130 the communications portal 400 bridges the consumer and agent legs of the calls together. This can be achieved in the communications portal with hard bridging of the calls, or it may be achieved using TBT (Take Back and Transfer), SS7 Signaling or proprietary signaling schemes of the carrier so the communications portal no longer needs to be in the loop. Alternately, the communications portal 400 may stay in the communication in a listen-only or prompt mode and be used by the carrier as a media server and recording device. Once the communication between the consumer and the agent is complete, the caller and agent may hang up in step 3140. At this point, the communications portal 400 does call tear-down, housekeeping and finalizes call transaction information in the database for future use in a step 3150.

Figure 5:
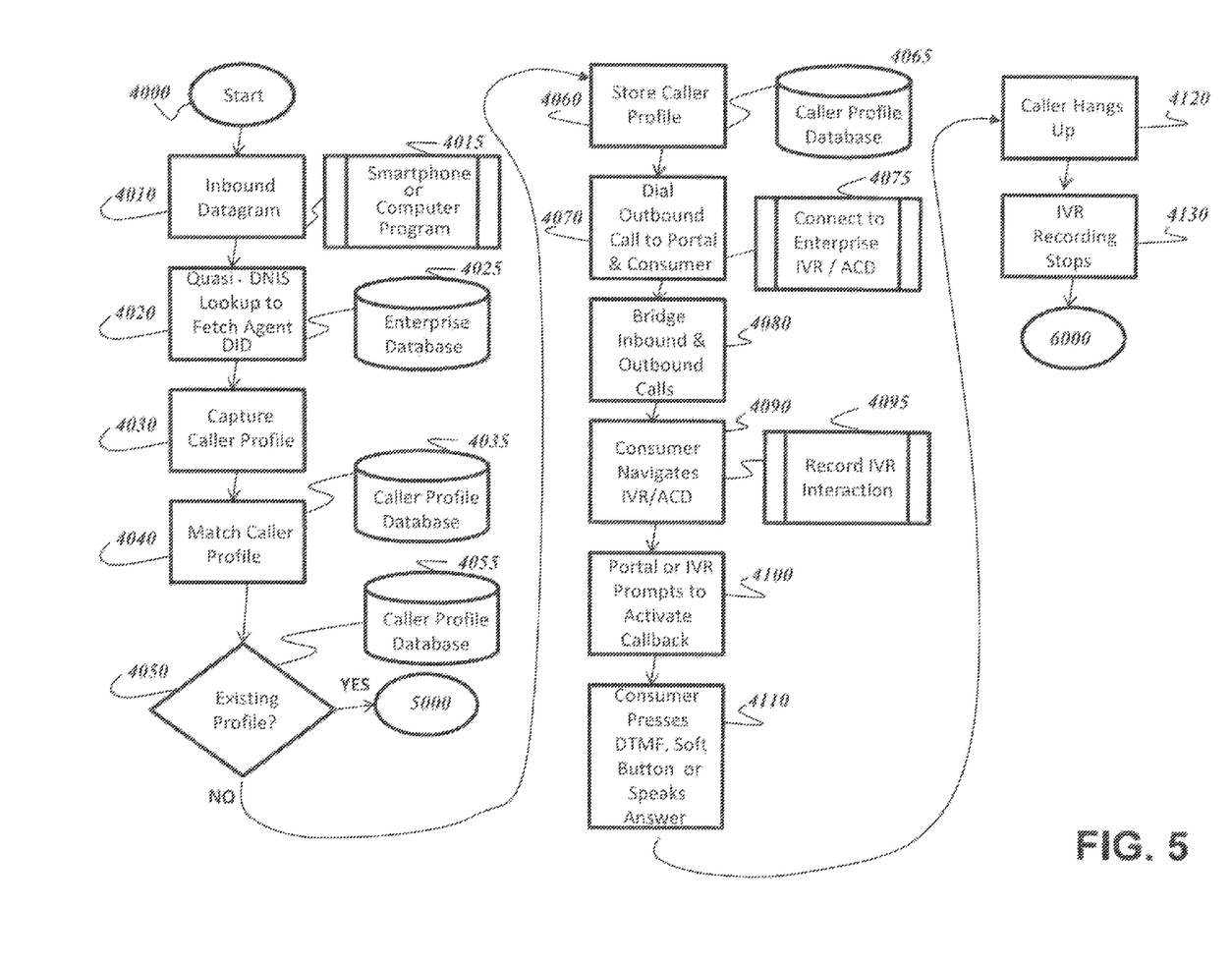
FIG. 5 is a flowchart showing the steps of setting up the proxy callback from a smart phone or a computer.

FIG. 5 illustrates the process of proxy call back with a smartphone or computer, beginning with a start point 4000. A consumer starts the process by selecting a smartphone or computer menu choice 4015, which subsequently sends a datagram in a step 4010 to the communications portal 400. The display of a Toll-Free number on the consumer's screen can actually be a hyperlink corresponding to a URL, rather than sending a command to the Smartphone or resident dialer to place a phone call. This URL can retrieve a Web page for displaying visual information or may contain fields for collecting additional data. Submitting these data fields to the telecommunications device over the Web can initiate call-back activities. The URL may also establish a real-time media stream between the consumer device and the telecommunications device, thus allowing a Voice over IP call to take place without initiating a call over a Toll-Free number or traditional phone line. This real-time media stream can also be established between the consumer and the remotely located enterprise system, using SIP signaling to collect call data in the telecommunications device.

At step 4020, the communications portal 400 matches the datagram with a quasi-DNIS (Dialed Number Identification Service) record and matches this number with the enterprise database 4025. This is used to ascertain the IVR/ACD queue or extension to call once an outbound leg to the enterprise 120 has been established. Next, in a step 4030, the communications portal 400 captures the caller's identifying information (quasi-ANI) that was passed by the smartphone or the computer. At step 4040, this quasi-ANI or other identifying information is matched with the caller profile database 4035.

The communications portal 400 determines whether or not the caller has an existing profile in the database based on the matching of the quasi-ANI in a step 4050. If the caller does have an existing profile in the database, the progression of the transaction transitions to step 5000, discussed below. Otherwise, if the caller does not have an existing profile, at step 4060 the quasi-ANI is stored in the caller profile database 4065.

At step 4070, the communications portal makes an outbound call to the Enterprise IVR/ACD 4075. Then, in step 4080, the inbound call from the consumer and the outbound call to the enterprise 120 are bridged. The consumer navigates the enterprise IVR/ACD while the communications portal 400 begins to record the interactions of the consumer per 4095 in order to build profile information to be used in subsequent interactions or for error recovery in the same transaction. The IVR/ACD prompts the caller for preferences to activate a callback in step 4100. Such preferences may include, but are not limited to preferred call-back time, preferred callback number, and skill preferences for the agent. Alternately, the communications portal may use its own IVR capabilities to prompt the caller for preferences. The consumer provides answers on preferences via speech commands or touch tone commands in step 4110. Alternately, soft keys may be activated on a smartphone or computer to achieve the same result. At step 4120 the caller may disconnect, whereupon the communications portal ceases the transaction recording in a step 4130. The next step in the process continues with a step 6000, detailed below.

Figure 6:
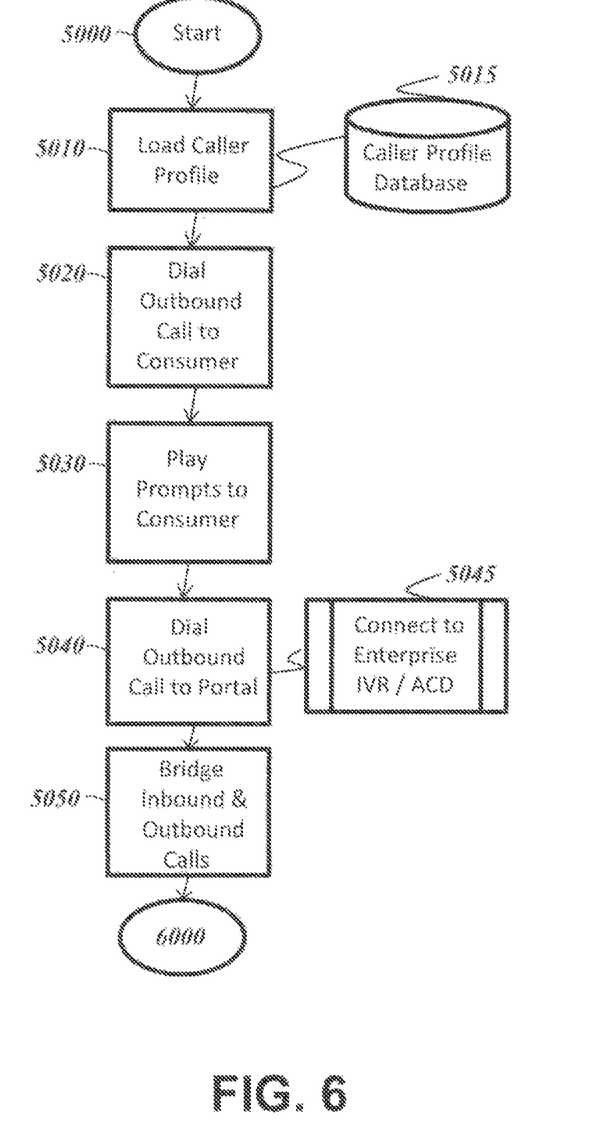
FIG. 6 is a flowchart showing the steps of setting up the proxy callback from a smart phone or a computer where caller's profile is known.

FIG. 6 is a flowchart illustrating further detailed steps of the process where the consumer profile is known per step 4050. Again, it is understood that the following steps pertain specifically to the Smartphone or computer user, and begins with a starting point 5000 as mentioned previously. The consumer profile is loaded into the memory of the communications portal 400 in a step 5010 from the caller profile database 5015. At step 5020, the consumer is prompted for the preferred path for the enterprise 120 called. The responses may be in the form of speech commands or touch-tones. Alternately, the consumer may activate soft keys on the smartphone or computer to achieve the same result. Such preferred paths represent navigation preferences which may be stored as quasi "Speed dial" numbers or sequences.

In a step 5030, the communications portal 400 makes an outbound call to the enterprise IVR/ACD 5045. The inbound call from the consumer and the outbound call to the enterprise 120 are bridged in step 5040. At this point, the profile information stored on behalf of the consumer is used to navigate the IVR/ACD without intervention from the consumer. The communications portal may idle the transmission path to the consumer so the consumer does not have to hear the navigation steps. At such time, courtesy tones or music may be played to the caller. The next step in the process continues with a step 6000.

Figure 7A:
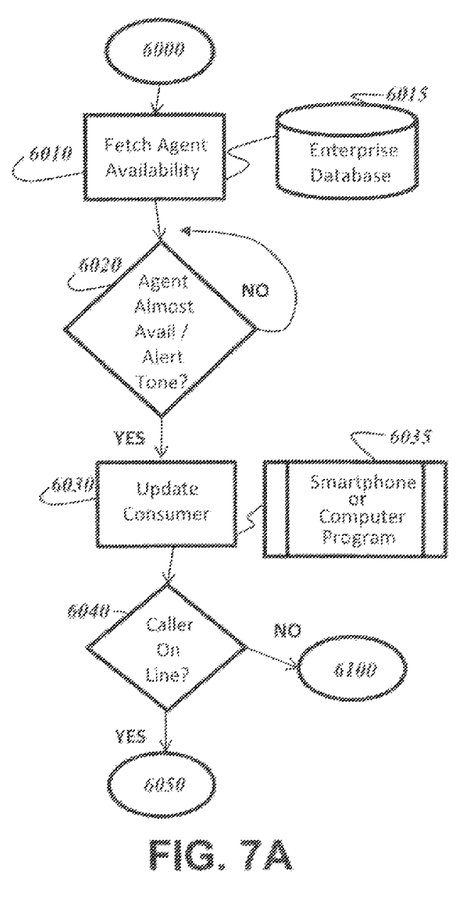
FIG. 7A-7C are flowcharts showing proxy queuing and callback from a smart phone or a computer.

With reference to the flowchart of FIG. 7A, the proxy queuing and call back process for a smartphone or a computer continues with a starting point 6000. At step 6010, the communications portal 400 ascertains agent availability. This is achieved by checking the enterprise database 6015 or by using established call pattern algorithms or brute force checking as described above in relation to FIG. 1. Next, in step 6020, agent availability confirmation may be made by an available agent by responding to prompts from the communications portal 400. Such prompts may be in the form of spoken word or screen messages using a non-CTI widget or instant message channel. This does not preclude the ability to select an available agent without agent prompting. At step 6030, agent availability information may be passed to the consumer's smartphone. If an agent is not available, the communications portal 400 may play prompts to the consumer or send other on-line messages to the consumer (SMS, Email, etc.) to alert the consumer of wait times. These progress tones or messages to the consumer may continue until an agent is available. Alternately, alerts may be sent directly to a smartphone or computer as described in step 6035.

Figure 7B:
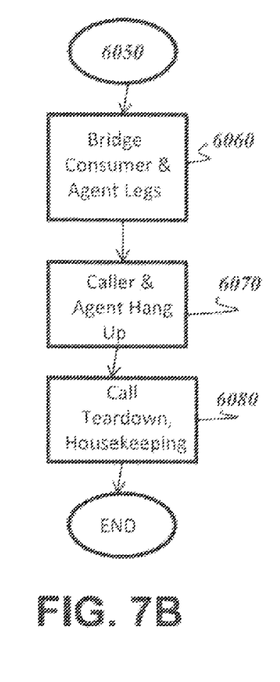
Figure 7C:
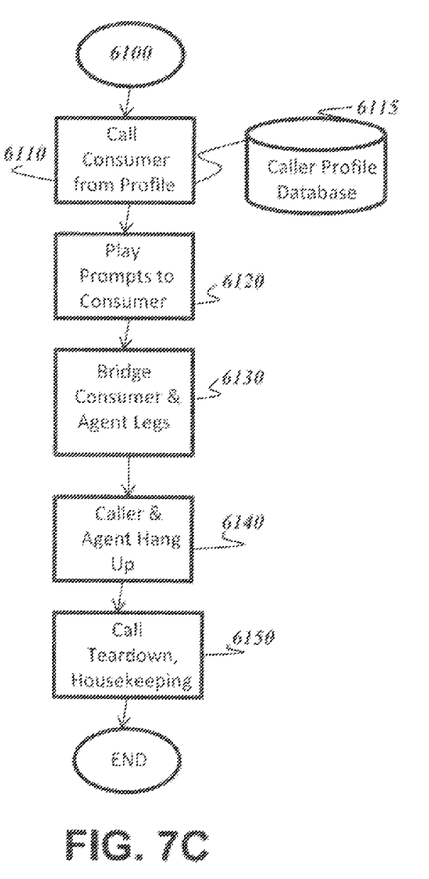

A determination is made as to whether or not the consumer is already on the phone, or must be called, in a step 6040. If the caller is already on the phone, the process continues at step 6050, the additional steps of that part of the process being described in the flowchart of FIG. 7B. If the caller is not already on the phone the process continues at step 6100, the details of which are shown in the flowchart of FIG. 7C.

The step 6050 represents the start point of the process for a call already in progress. At step 6060 when an agent is available, the communications portal 400 bridges the consumer and agent legs of the calls together. This can be achieved in the communications portal with hard bridging of the calls, or it may be achieved using TBT (Take Back and Transfer), SS7 Signaling or proprietary signaling schemes of the carrier so the communications portal no longer needs to be in the loop. Alternately, the communications portal 400 may stay in the communication in a listen-only or prompt mode and be used by the carrier as a media server and recording device. Once the communication between the consumer and the agent is complete, the caller and agent may hang up in a step 6070. At this point, the communications portal 400 performs call teardown, housekeeping and finalizes call transaction information in the database for future use per step 6080.

The step 6100 represents the start point of the process for calls not yet on the line. The communications portal 400 loads the caller profile information into memory per step 6110 if it is not already in memory. This profile is loaded from the caller profile database 6115. At step 6120, prompts are played to the consumer alerting the consumer of the purpose of the call, that is, to tell the caller that this is the call they were expecting from the previously requested enterprise. Then the communications portal 400 bridges the consumer and agent legs of the calls together in a step 6130. This can be achieved in the communications portal with hard bridging of the calls, or it may be achieved using TBT (Take Back and Transfer), SS7 Signaling or proprietary signaling schemes of the carrier so the communications portal 400 no longer needs to be in the loop. Alternately, the communications portal 400 may stay in the communication in a listen-only or prompt mode and be used by the carrier as a media server and recording device. Once the communication between the consumer and the agent is complete, the caller and agent may hang up in a step 6140. At this point the communications portal proceeds with call tear-down, housekeeping and finalizes call transaction information in the database for future use per step 6150.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A communications portal system comprising:
a gateway signaling proxy configured to logically connect to a contact center and a communication device of a user, wherein the gateway signaling proxy is operative to initiate communication with the communication device and with the contact center, bridge communication between the communication device and the contact center, and receive from the communication device a request to communicate with the contact center;
a control server logically connected to the gateway signaling proxy, wherein the control server is operative to control the gateway signal proxy; and
an application server logically connected to the gateway signaling proxy and the control server, wherein the application server is operative to retrieve a navigation instruction from a storage device based on information associated with the request;
wherein the communications portal system is operative to use the navigation instruction to automatically navigate menu options of the call center through a communication link between the gateway signaling proxy and the call center.

2. The communications portal system of claim 1, further operative to identify and store a contact information associated with the request and subsequently retrieve and use the stored contact information to initiate communication with the user.

3. The communications portal system of claim 2, wherein the contact information is a phone number and is derived using a dialed number identification service.

4. The communications portal system of claim 2, wherein the contact information is a phone number and is derived using a quasi-dialed number identification service.

5. The communications portal system of claim 1, further operative to identify a contact information associated with the request and reject the request if the contact information satisfies a predetermined condition.

6. The communications portal system of claim 5, wherein a rejected request is redirected to the contact center over a telecommunications link.

7. The communications portal system of claim 6, wherein communication data transmitted to the contact center over the telecommunications link following the redirection is stored in the storage device.

8. The communications portal system of claim 1, wherein the gateway signaling proxy bridges communication between the communication device and the contact center based on one or more predefined conditions.

9. The communications portal system of claim 8, wherein the predefined conditions includes the activation of answer supervision by the contact center.

10. The communications portal system of claim 1, further comprising:
a media server logically connected to the gateway signaling proxy, the media server has stored thereon multimedia content transferable to the communication device;
wherein the communications portal system is receptive to one or more inputs provided in response to the multimedia content, wherein the one or more inputs are received from the communication device.

11. The communications portal system of claim 10, wherein the inputs are of a type selected from the group consisting of: dual-tone multi-frequency input, voice input, and soft key input.

12. The communications portal system of 1, further comprising:
a media server configured to logically connect to the communication device over an Internet Protocol (IP) communications protocol, the media server has stored thereon multimedia content transferable to the communication device;
wherein a hyperlink to the media server provided to the communication device is presented as a phone number.

13. The communications portal system of claim 1, wherein the application server is operative to cause one or more prompts to be transmitted to the communication device according to the navigation instruction, and wherein the storage device is operative to store one or more inputs received from the communication device provided in response to the one or more prompts.

14. The communications portal system of claim 13, wherein:
the gateway signaling proxy is operative to terminate communication with the communication device upon a storage of the one or more inputs and a contact information associated with the user; and
the communications portal system is operative to use at least one of the one or more inputs to navigate the menu options of the call center subsequent to the termination of the communication with the communication device.

15. The communications portal system of claim 13, wherein:
the gateway signaling proxy is operative to terminate communication with the communication device upon a retrieval from the storage device a navigation history associated with the user; and
the communications portal system is operative to use the navigation history to navigate the menu options of the call center subsequent to terminating the communication with the communication device.

16. The communications portal system of claim 1, further operative to maintain a communication with the call center, thereby holding a position on behalf of the user in a waiting queue associated with the call center.

17. The communications portal system of claim 1, wherein the gateway signaling proxy is operative to reestablish communication with the contact center upon detection of an error condition that caused a previous communication with the contact center to terminate.

18. The communications portal system of claim 17, wherein the application server is operative to reuse the navigation instruction to automatically navigate the menu options upon the reestablishment of the communication with the contact center.

19. The communications portal system of claim 18, wherein the navigation instruction effectively causes the application server to retrieve a navigation history associated with the user from the storage device and use the navigation history to navigate the menu options.

20. The communications portal system of claim 1, wherein the application server is operative to prompt the user with a pre-configured message after a detection of an answer supervision.

21. The communications portal system of claim 1, wherein the application server is operative to prompt the contact center with a pre-configured message after a detection of an answer supervision.

22. The communications portal system of claim 1, wherein the application server is operative to cause the gateway signaling proxy to initiate communication with the contact center, wherein one or more observed characteristics of the communication are stored in the storage device.

23. The communications portal system of claim 22, wherein one of the one or more observed characteristics is one of answer supervision, error codes, and elapsed time in a waiting queue associated with the call center.

24. The communications portal system of claim 1, further operative to generate a prediction on incoming request pattern.

25. The communications portal system of claim 24, wherein the application server is operative to cause the gateway signaling proxy to pre-establish communication with to the contact center based on the prediction prior to receiving the request.

26. The communications portal system of claim 25, wherein the gateway singling proxy is operative to bridge the pre-established communication with the contact center with the communication device associated with the request subsequently received.

27. The communications portal system of claim 25, wherein the pre-established communication effectively holds a position in a waiting queue associated with the contact center.

28. The communications portal system of claim 24, further comprising a management user interface through which one or more confidence levels for the prediction are assigned.

29. The communications portal system of claim 1, further operative to generate estimation data pertinent to the request and transmit the estimation data to the communication device.

30. The communications portal system of claim 29, wherein the estimation data relates to call center agent availability.

31. The communications portal system of claim 29, wherein the estimation data relates to wait time.

32. The communications portal system of claim 29, wherein the estimation data is presented to the user as audio.

33. The communications portal system of claim 29, wherein the estimation data is transmitted to the user over a Short Messaging Service (SMS) message.

34. The communications portal system of claim 29, wherein the estimation data is transmitted to the user over an e-mail message.

35. The communications portal system of claim 1, wherein the navigation instruction includes a script.

36. The communications portal system of claim 35, wherein the script uses one or more pre-stored navigation inputs provided by the user.

37. The communications portal system of claim 1, further comprising:
a media server configured to logically connect to the gateway signaling proxy, wherein the media server provides multimedia to be transmitted to the contact center for navigating the menu options.

38. The communications portal system of claim 1, wherein the gateway signaling proxy is operative to put the communication device on hold while the communications portal system navigates the menu options of the contact center.

39. The communications portal system of claim 1, wherein the gateway signaling proxy is operative to terminate communication with the communication device while the communications portal system navigates the menu options of the contact center, reestablish communication with the communication device based on a predetermined condition, and bridge communication between the communication device and the contact center.

* * * * *